May 26, 1925.
N. M. NICHOLSON
COMBINED VEHICLE BUMPER AND EXTRACTOR
Filed Aug. 4, 1924
1,539,138
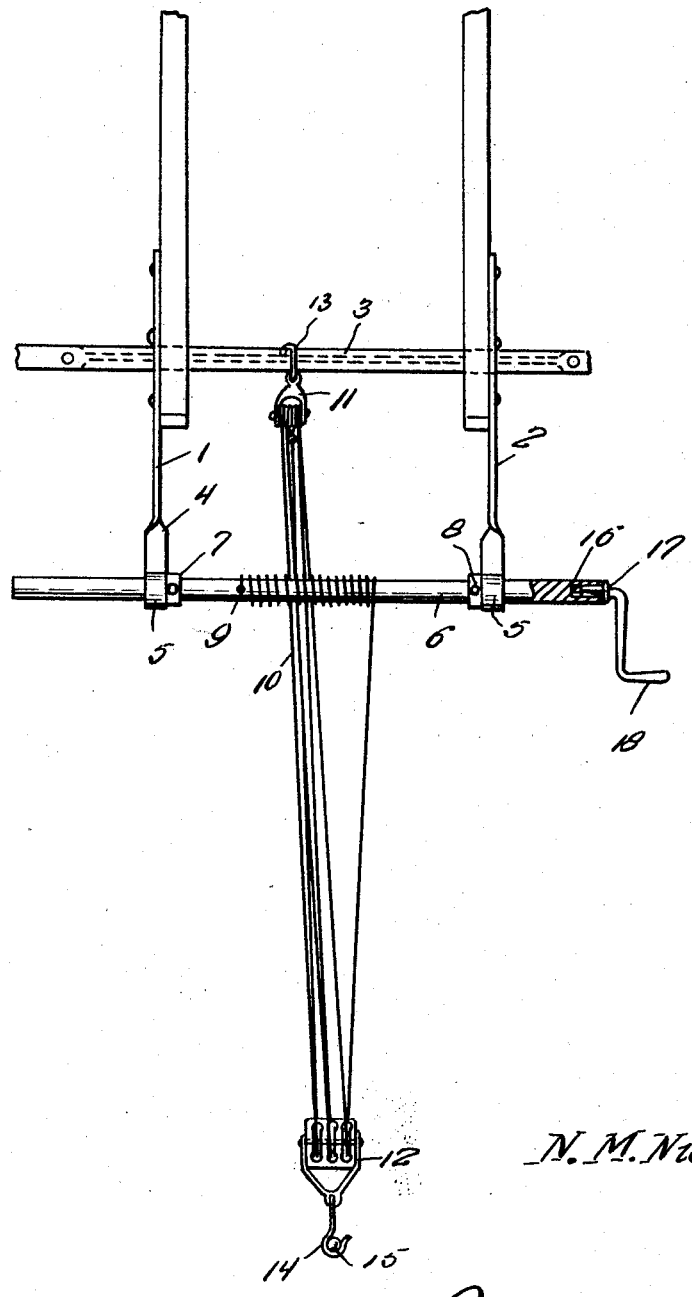

Patented May 26, 1925.

1,539,138

UNITED STATES PATENT OFFICE.

NOLL M. NICHOLSON, OF TEMPLE, TEXAS.

COMBINED VEHICLE BUMPER AND EXTRACTOR.

Application filed August 4, 1924. Serial No. 729,998.

*To all whom it may concern:*

Be it known that I, NOLL M. NICHOLSON, a citizen of the United States, residing at Temple, in the county of Bell and State of Texas, have invented certain new and useful Improvements in a Combined Vehicle Bumper and Extractor, of which the following is a specification.

This invention relates to improvements in a combined vehicle bumper and extractor and has for its principal object to provide a simple and efficient means whereby a vehicle is protected at the front against any damage when colliding with another vehicle, the bumper further providing a means whereby the vehicle may be extracted from a muddy surface.

Another important object of the invention is to provide a device of the above mentioned character, which includes a bumper which extends transversely across the front of the vehicle, means being provided for supporting the same thereon and means being further provided for preventing the endwise movement of the bumper.

A further object of the invention is to provide a device of the above mentioned character, wherein the same may be readily and easily assembled for use as a means for extracting the vehicle when the rear wheels of the same have become stuck in the mud.

A further object of the invention is to provide a combined bumper and vehicle extractor of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

The figure is a top plan view of the present invention showing the same in use as the vehicle extractor.

In the drawing wherein for the purpose of illustration is shown the preferred embodiment of my invention, the numerals 1 and 2 designate a pair of supporting brackets which are adapted to be secured at their inner ends to the chassis of a motor vehicle in any suitable manner and the forward end of the supporting bracket extends beyond the frame and front axle 3 in the manner clearly illustrated in the drawing. Each of the supporting brackets comprises an iron strap and the forward end thereof is twisted as illustrated at 4 and is provided with the looped portion 5, the purpose of which will be presently described.

Extending through the looped portion 5 of the supporting bracket is the elongated cylindrical bar 6, the ends of which extend beyond the supporting bracket for a suitable distance and further protects the front bumpers (not shown), in the manner well known in the art. The cylindrical bar 6 provides a bumper for the vehicle and the same is adapted for rotary movement within the looped portion 5 of the bracket. Collars such as are shown at 7 are secured on the cylindrical bar 6 adjacent the inner side of the forward end of the bracket for the purpose of preventing any endwise movement of the cylindrical bar with respect to the looped portion of the supporting bracket. A set screw such as is illustrated at 8 is associated with each of the collars 7 for holding the same in position on the cylindrical bar.

The cylindrical bar 6 is provided with an opening 9 in the intermediate portion thereof whereby the free end of a cable 10 may be secured to the bar when the bar is to be used in extracting the vehicle from the mud. A pair of pulleys 11 and 12 are associated with the cable 10, a hook 13 being associated with the pulley 11 for engagement with the front axle 3 while a hook 14 is associated with the other pulley 12 for engagement with a stake 15 which is driven in the ground at a point forwardly of the vehicle. The hook 14, may if desired, be engaged with any other suitable stationary support, such as a tree, post or the like.

Formed in one end of the cylindrical bar 6 is a substantially square shaped socket 16 for receiving the square shaped head 17 of an operating handle 18. With the parts arranged as shown in the drawing, it will be readily seen that when the handle 18 is rotated, the bar 6 will also rotate in the looped portions of the supporting brackets 1 and 2 causing the cables 10 to be wound around the cylindrical bar and permitting the vehicle to be extracted from the mud in the manner well known in the art.

After the rear wheels of the vehicle have been pulled out of the mud, the pulleys may be disengaged from the front axle and stake and the cable removed from the cylindrical bar. The handle 18 may be also removed from engagement with the bar and the parts thus removed may be placed in the tool kit of the vehicle. The bar 6 will then provide a bumper for protecting the front of the vehicle.

It will thus be seen from the foregoing description, that a combined bumper and vehicle extractor for motor vehicles has been provided which will at all times be efficient and positive in carrying out the purposes for which the same is designed and may be readily used as a vehicle extractor whenever necessary.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A combination automobile bumper structure comprising a pair of attaching brackets provided with bearings, a solid cylindrical rod rotatably mounted in said bearings and adapted to function as a bumper and as a drum, said rod being provided at one end with a socket for reception of one end of a removable crank handle, and stop collars slidably and adjustably mounted upon said rod and abutting the inner sides of said bearing brackets.

In testimony whereof I affix my signature.

N. M. NICHOLSON.